United States Patent [19]
Sallen

[11] 3,985,117

[45] Oct. 12, 1976

[54] SOLAR SENSOR-HEATER

[76] Inventor: Leroy H. Sallen, 225 Country Club Drive, Largo, Fla. 33540

[22] Filed: Dec. 26, 1974

[21] Appl. No.: 536,551

[52] U.S. Cl. .............................. 126/271; 237/1 A
[51] Int. Cl.² ......................................... F24J 3/02
[58] Field of Search ............ 126/270, 271; 237/1 A, 237/80; 137/59

[56]      References Cited
          UNITED STATES PATENTS

| | | | |
|---|---|---|---|
| 1,753,227 | 4/1930 | Wheeler et al. | 126/271 |
| 1,888,620 | 11/1932 | Clark | 126/271 |
| 2,277,311 | 3/1942 | Freeman | 126/271 |
| 2,342,211 | 2/1944 | Newton | 126/271 |
| 2,553,302 | 5/1951 | Cornwall | 126/271 |
| 3,039,453 | 6/1962 | Andrassy | 126/271 |
| 3,107,052 | 10/1963 | Garrison | 126/271 |
| 3,145,707 | 8/1964 | Thomason | 126/271 |
| 3,620,206 | 11/1971 | Harris, Jr. | 126/271 |
| 3,812,872 | 5/1974 | Block et al. | 237/80 |
| 3,815,574 | 6/1974 | Gaydos, Jr. | 126/271 |

FOREIGN PATENTS OR APPLICATIONS

| | | | |
|---|---|---|---|
| 835,381 | 12/1938 | France | 126/271 |
| 1,141,261 | 8/1957 | France | 126/270 |
| 773,659 | 5/1957 | United Kingdom | 126/271 |

*Primary Examiner*—John J. Camby
*Assistant Examiner*—Henry C. Yuen
*Attorney, Agent, or Firm*—Duckworth, Hobby, Orman, Allen & Pettis

[57]                ABSTRACT

A solar sensor-heater comprising a fluid conduit coiled about a black body enclosed in an insulated container. One side of the container is transparent to allow solar radiation to impinge upon the fluid conduit and black body. A pump is located in the fluid conduit output. A temperature sensing device is located upon the fluid conduit and senses the temperature of the fluid in the conduit and thereby turns the pump on or off as required.

6 Claims, 4 Drawing Figures

SOLAR SENSOR-HEATER

BACKGROUND OF THE INVENTION

1. Field of the Invention

A solar heater with temperature sensing device to control the flow of the fluid through the heating coils.

2. Description of the Prior Art

Solar heating systems have long been known as a method of obtaining hot fluid without the use of traditional fuels. The prior art is exemplified by patents to H. A. Wheeler, U.S. Pat. Nos. 1,753,227, 1,853,480, and 1,971,242.

There are certain inherent disadvantages exemplified in the prior art. In the first place these units are generally not self contained. They usually rely on line pressure to force the fluid through the coils of the heat exchanger. This is obviously a problem when there is no line pressure. A second problem arises due to inadequate insulation of the heat exchanger and inefficient absorption means for the solar radiation. A third problem present in the prior art is that temperature sensors are frequently located in direct contact with fluid flow and therefore impair the flow of fluid through the coils.

Temperature sensors are also utilized in prior art devices as mechanical means to regulate the flow of fluid through coils. The temperature sensors in this manner frquently results in a complex system relying upon expansions of metals to accomplish control of fluid flow. Problems can thus arise when the fluid being heated in the exchanger contains chemicals which are deposited around the flow valve causing the valve to become inoperable. The complexity of such prior art systems generally produces overly expensive devices which are frequently too costly to purchase and maintain.

Another problem often prevalent in commercially available devices is damage due to freeze or boil overs. Devices to prevent bursting of the coils during either periods of extreme cold or during periods of extreme heat are therefore required.

Thus, a need exists in related industry for a self-contained solar heating system with maximum insulation and maximum absorption of solar radiation. Ideally, such a system should include sensors efficiently designed and disposed in the system to render the system operable utilizing a structurally simplified system which is economically feasible.

SUMMARY OF THE INVENTION

The present invention is directed to a solar sensor heater comprising a self-contained, insulated unit including a container or casing. The container includes a plurality of layers of insulation material at least partially defining a base. The sides of the container are also sufficiently insulated to regulate or control the temperature on the interior of the container. The top of the container comprises a transparent covering extending over at least a portion of the container and disposed for maximum exposure to solar radiation. The remainder of the container not covered by the transparent material is enclosed with non-transparent, and preferably non-translucent, material.

Within the portion of the container exposed to the solar radiation through the transparent medium there is contained a black body absorber and fluid conduit means coiled about the black body absorber. Located at a predetermined position upon the fluid conduit means is a temperature sensing means which has two states. The temperature sensing means is electrically connected to a pump means. When the temperature sensing means is in its first state, it energizes the pump, thus allowing fluid to be forced through the conduit. When the temperature sensing means is in its second state it de-energizes the pump thus preventing fluid from being forced through the fluid conduit means. The pump means is located on the interior of the container and preferably disposed out of direct communication with the solar radiation to which the interior of the container is exposed.

More specifically, a fluid source, which itself is not part of the present invention is connected in fluid communication with the pump means. Inlet and outlet conduits are, accordingly, disposed between the fluid source and the pump means and further between the pump means and a drain facility.

In operation, the system typically performs as follows. There is cool fluid within the fluid conduit means thus setting temperature sensing means in its second state. The pump means is thus de-energized and the fluid is retained within the fluid conduit means. Solar radiation impinges upon fluid conduit means and black body means. Said fluid conduit means and black body means absorb the impinging radiation and a temperature increase results. When the temperature of the fluid conduit means and the fluid contained therein reaches a predetermined level, temperature sensing means changes from off mode to on mode. In the on mode state, temperature sensing means energizes pump means and fluid is forced to flow through conduit means. Fluid continues to flow through fluid conduit means so long as temperature sensing means remains in state 1 indicating that the fluid is being heated to a predetermined temperature. When the fluid is no longer heated to a predetermined temperature, temperature sensing means changes state from state 1 to state 2 and thereby de-energizes pump means. Fluid no longer flows through fluid conduit means and remains in the solar sensor-heater until such time as temperature sensing means indicates that a predetermined temperature of the fluid has been reached. It can be seen that the solar sensor-heater is a self-contained unit which accepts fluid, allows the fluid to be heated by solar radiation to a predetermined temperature, and then permits the fluid to pass onward for use.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
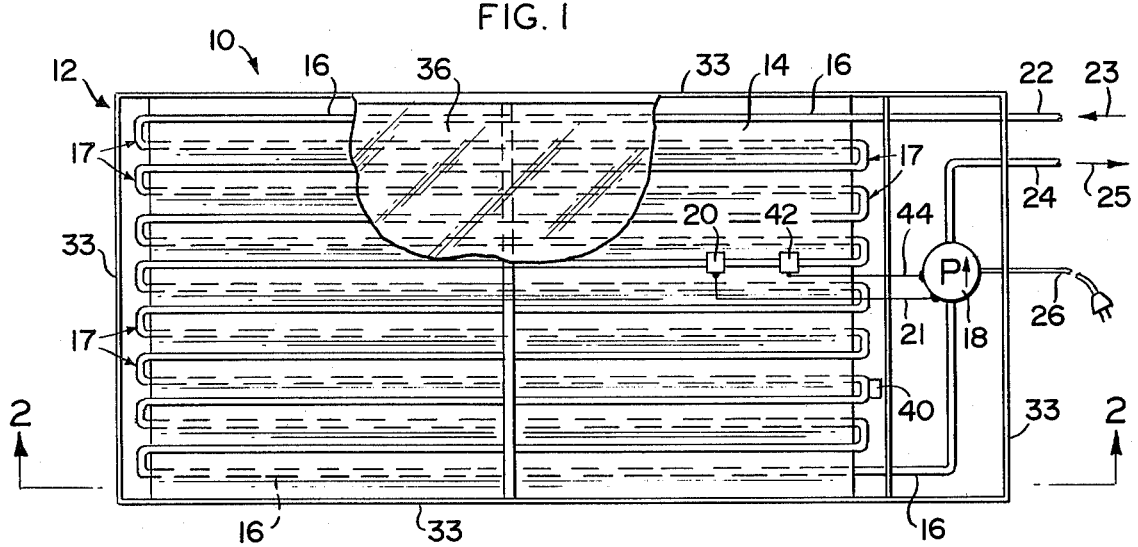
FIG. 1 is a top plan, partly cut-away view of the solar sensor-heater of the present invention.
Figure 4:
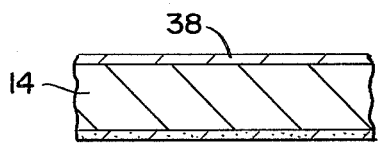
FIG. 4 is a partial cut-away view in cross section along line 4—4 of FIG. 3 showing the black body means of the present invention in detail.
Figure 2:
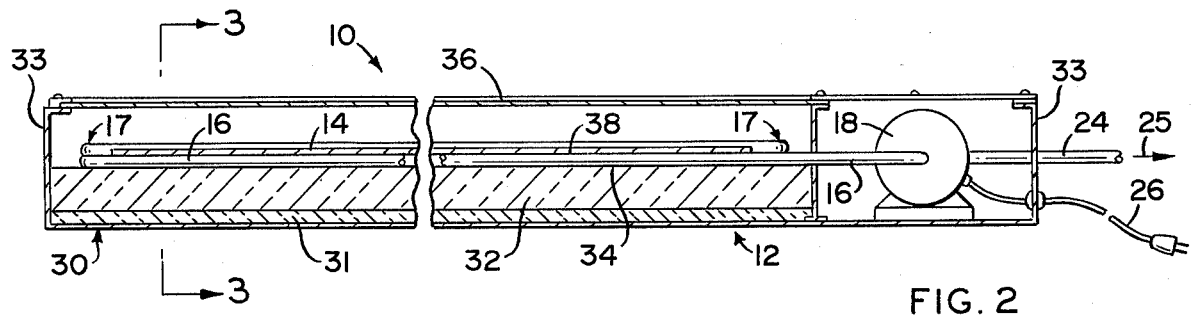
FIG. 2 is a sectional view along line 2—2 of FIG. 1.

A solar sensor-heater means 10 is self-contained within container means 12. Container means 12 is a box-like device comprising base means 30, side means 33 and top means 36. Base means 30 and side means 33 form the outer support and comprise an insulating material such as wood or like applicable insulating material. Top means 36 is connected to the container and is disposed in at least partially sealed relation to the remainder of the container. Accordingly, the top means serves to prevent air flow within container means 12. In the preferred embodiment, top means 36 is formed from transparent glass, plastic or similar applicable material. As will be explained in greater detail hereinafter, the transparent top means is disposed for substantially maximum exposure to ambient solar radiation.

Through at least one side means 33 pass a plurality of fluid connector means and at least one electrical connector means. As shown in FIG. 1, the fluid connector means comprises fluid input means 22 and fluid output means 24 wherein fluid flow is indicated by directional arrows 23 and 25 respectively. Electrical connector means 26 is connected to pump means 18 and also extends through side means 33. Base means generally indicated as 30 comprises a first insulation means 31 for isolation of the interior of container means 12 from the outside environment. Overlayed upon base means 30 is second insulating means 32. This serves to further insulate the interior of container means 12 from the exterior. First and second means may comprise wood, plastic or like, at least semi-rigid insulating material. Superimposed upon second insulation means 32 is reflector means 34. Typically, reflector means 34 comprises a reflective foil, however, any reflective material would be suitable.

The fluid to be subjected to solar radiation is input to solar sensor-heater means 10 through input means 22. The fluid then flows through fluid conduit means 16 comprising a series of coils 17 arranged in predetermined, preferably continuous fluid communicating relation to one another. These coils are formed from hollow tubing of any applicable configuration and are disposed such that solar radiation impinges upon maximum surface area of the fluid conduit means 16. Fluid then passes from the coils 17 to pump means 18 and then to output conduit means 24.

The maximum solar radiation is obtained by having fluid conduit means 16 coiled about black body means 14. Black body means in the preferred embodiment comprises a sheet of aluminum, however, any applicable material which is capable of absorbing solar radiation and acting as a heat sink so as to conduct collected "heat" to fluid conduit means 16. Beneath black body means 14 is reflective foil means 34. The surface of fluid conduit means 16 and black body means 14 which are exposed to solar radiation are coated with absorptive material by solar radiation absorptive means 38. Solar radiation absorptive means 38 comprises black paint in the present embodiment. However, any other material which acts to absorb solar radiation would be sufficient.

Figure 3:
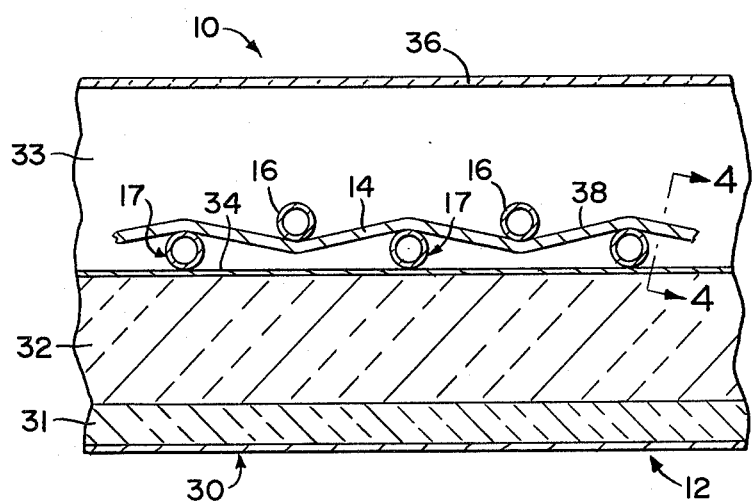
FIG. 3 is a detailed sectional side view along line 3—3 of FIG. 2.

An important structural feature of the present invention includes bracket body means 14 defined, at least in part, by an undulating configuration. Fluid conduit means 16 is thereby disposed in direct engagement with oppositely disposed surfaces of the black body sheet 14. More specifically, adjacently positioned and spaced apart conduit portions are each disposed in direct engagement with opposite surfaces of black body sheet 14, as best shown in FIG. 3. In the embodiment shown therein the conduit portions are disposed in heat conductive engagement in "troughs" 50 and 51 disposed on the opposite surfaces of the black body sheet element 14, as shown in FIG. 3.

The fluid to be subjected to solar radiation is circulated through the system by pump means 18. Pump means 18 comprises an electrical pump or applicable prime mover connected in fluid communication to the output fluid conduit 24.

A temperature sensing-signaling means 20 is electrically connected to pump means 18 and comprises a temperature sensitive switch located on fluid conduit means 16. Specifically, temperature sensing-signaling means 20 is in electrical communication with pump means 18 by electrical conductor means 21. Temperature sensing-signaling means 20 has at least two modes, an off mode and an on mode. In the off mode, temperature sensing means 20 de-energizes pump means 18 upon the sensing in fluid conduit means 16 of a predetermined temperature. In the on mode, temperature sensing-signaling means 20 energizes pump means 18. When the temperature within fluid conduit means 16 reaches a predetermined level, temperature sensing-signaling means 20 energizes pump means 18 allowing fluid to be pumped through fluid conduit means 16. When temperature sensing-signaling means 20 senses that the temperature has fallen below the predetermined level, it de-energizes pump means 18, thus allowing fluid to remain in fluid conduit means 16.

A boil protection means comprises an in line fluid sensor set at a specific predetermined temperature to automatically activate a fluid release to the atmosphere upon sensing a predetermined temperature. Upon sensing that temperature of the fluid in fluid conduit means 16 is below the preset level, boil protection means 40 closes the fluid release. In the preferred embodiment, boil protection means 40 comprises a spring loaded pressure sensitive valve located in fluid conduit means 16 and operable upon sensing a predetermined high temperature of the fluid in the fluid conduit means 16.

Freeze protection is accomplished by a second temperature sensing-signaling means 42 in electrical communication with pump means 18 by electrical conductor means 44. Temperature sensing-signaling means 42 has two modes. When the temperature of fluid conduit means 16 is above preset level, close to the freezing point of the fluid in fluid conduit means 16, pump means 18 is de-energized. When the temperature falls below the predetermined level, temperature sensing-signaling means 42 causes pump means 18 to activate causing fluid to flow through fluid conduit means 16. This will protect the system against freezing during a night operation or whenever the sun is not shining in a sub-freezing environment by a reverse operation of the system.

Fluid conduit means 16 coiled about or in predetermined engagement with black body means 14 is supported by a base means 30 with insulation means 32 and reflective means 34 disposed in predetermined relation thereto. Accordingly the heat energy collected and maintained by black body means 14 is transferred by conduction to fluid conduit means 16 to the fluid contained therein.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described, what is claimed is:

1. A solar sensor and heater means comprising fluid conduit means, fluid inlet means and fluid outlet means both interconnected in fluid communicating relation to said fluid conduit means, whereby fluid is directed to and from said fluid conduit means at substantially spaced apart points thereof, black body means including a heat conductive sheet element having a substantially undulating configuration along at least a portion of its length, adjacent and successively disposed predetermined portions of said fluid conduit means positioned in direct engagement with oppositely disposed surfaces of said sheet element, pump means disposed in fluid regulating relation to fluid within said fluid conduit means and temperature sensing/signalling means disposed in temperature sensing engagement with said fluid conduit means and in electrically connected actuating relation with said pump means, whereby fluid flow to and from said fluid conduit means is regulated by activation of said pump means dependent upon the sense temperature of the fluid conduit means.

2. A solar sensor and heater means as in claim 1 wherein each of said predetermined portions of said fluid conduit means is disposed in direct heat conductive engagement in a trough of said conductive sheet element defined by oppositely disposed surfaces of said sheet element.

3. A solar sensor and heater means as in claim 1 further comprising base means including a first insulating means and a second insulating means disposed in overlaying relation to said first insulating means, reflector means overlaying at least a portion of said second insulating means, said fluid conduit means disposed at least in part between said reflector means and an under surface of said black body means and in heat conductive engagement with the under surface of said black body means.

4. A solar sensor and heater means as in claim 1 wherein temperature sensing and signalling means further comprises temperature sensing means located in direct contact with said fluid conduit means and in segregated relation to the fluid within said fluid conduit means, said temperature sensing means disposed in electrically, actuating connection with said pump means.

5. A solar sensor and heater means as in claim 1 further comprising freeze protection means and boil protection means both disposed in direct heat conductive engagement with said fluid conduit means and each disposed in electrically connected, on and off activating relation with said pump means, whereby operation of said pump means is regulated by the determination of temperature of said fluid conduit means sensed by said boil protection means and said freeze temperature sensing means.

6. A solar sensor and heater means as in claim 1 wherein said black body means comprises a heat conductive sheet element having solar radiation absorptive means deposited thereon.

* * * * *

UNITED STATES PATENT AND TRADEMARK OFFICE
CERTIFICATE OF CORRECTION

PATENT NO. : 3,985,117
DATED : October 12, 1976
INVENTOR(S) : Leroy H. Sallen

It is certified that error appears in the above—identified patent and that said Letters Patent are hereby corrected as shown below:

Column 5, line 29, delete "sensing/signalling" and
insert therefor--sensing and signalling--.

Signed and Sealed this

Twenty-second Day of February 1977

[SEAL]

Attest:

RUTH C. MASON
*Attesting Officer*

C. MARSHALL DANN
*Commissioner of Patents and Trademarks*